United States Patent Office.

GEORGE W. RAY, OF SPRINGFIELD, MASSACHUSETTS.

*Letters Patent No.* 54,404, *dated May* 1, 1866; *reissue No.* 3,132, *dated September* 22, 1868.

IMPROVEMENT IN THE MANUFACTURE OF PAPER COLLARS, &c.

The Schedule referred to in these Letters Patent and making part of the same.

TO ALL WHOM IT MAY CONCERN:

Be it known that I, GEORGE W. RAY, of Springfield, in the county of Hampden, and State of Massachusetts, have invented a new and useful Improvement in the Mode of Preparing Paper for Conversion into Articles of Wearing-Apparel; and I do hereby declare that the following is a full, clear, and exact description, reference being had thereto, and to the accompanying specimens of collars, to which my invention is applied.

The purpose of my invention is to more closely imitate the linen fabric of which collars, cuffs, and bosoms are made; and consists in preparing and adapting paper, as hereinafter described, to the manufacture of such articles.

To enable others skilled in the art to make and use my invention, I will proceed to describe its construction and application to use.

Paper collars and cuffs have become important and extensive articles of manufacture, and many modes of preparing them to imitate the linen collars have been proposed, but as yet no successful result has been attained.

The paper collars in commerce have a plain and smooth surface, very unlike the linen collars they are made to take the place of, except when they are ornamented by color-printing, and these but faintly resemble calico collars.

By my invention I am enabled to imitate not only the fibre and figure of textile fabrics and laces, but the finished gloss or starched face of such fabrics, thus making an exact imitation of the linen collar, when prepared by all the appliances of a laundry for use.

It is accomplished as follows:

I take a suitable paper, which possesses a degree of strength, rigidity, and purity, whether backed up by or having combined in it a thin textile fabric to increase its strength, or not, and apply any preparation of white lead, known as "Cremnitz white," or its equivalent, or any common enamel, in its wet, plastic state, and when dried, I emboss on its face or back, or both, any suitable design, such as the imitation of the fibre or texture of linen, or other fabric, or the figure of Marseilles, or the various figured laces used for ladies' collars, and I then finish the enamelling process by passing it between calenders or rollers, or by pressing it between metallic plates, to imitate the gloss or surface usually imparted to linen collars and cuffs by starching and ironing.

This pressing or polishing of the surface may be regulated to give the surface the desired degree of finish or gloss, more or less, as the case may be, and in some styles of goods it may be desired to enamel and emboss or ornament both sides of the collar or cuff, where both sides of the same may be exposed to view, and where it is desired to carry the imitation to as great a degree of perfection as possible; and, in fact, it is impossible to imitate perfectly some styles of goods manufactured in cloth, without embossing or ornamenting in connection with enamelling both sides.

It is evident that the paper may be treated in this way before the article of apparel is cut therefrom, or the articles themselves may be enamelled and embossed after being cut from plain paper, as may be desirable.

This process is susceptible of many modifications known to the art; and it will be perceived that not only is the figured appearance of the linen given to the surface of the paper, but the surface of the finest textile collars and cuffs, and other articles, is closely imitated.

When my invention is used to imitate ladies' collars of lace, the article may be perforated to imitate the open work or embroidery, and may have its edges scalloped or cut in any other design, and may be ornamented by color-printing.

It is obvious that my invention is equally applicable to other articles of paper wearing-apparel without departing from its principle of operation.

I am aware that articles of wearing-apparel, made of paper, have been made with enamelled surfaces, but as it is well known that the process of finishing the enamelled surface is by heavy pressure, either between rolls or metallic plates, it will be perceived that a finished enamelled surface will not so easily take or receive fine impressions in the process of embossing.

By my invention, the unfinished surface of the enamel, not having been subjected to the heavy pressure in the process of finishing, by rolling or pressing, is left soft, and is far more susceptible of receiving any impression, even to the finest thread, and the surface can then be rolled or pressed to any desired degree of hardness and finish.

The advantages of my invention are thus very readily perceived.

I do not claim a finished enamelled paper, neither do I claim embossing upon a finished enamelled surface; but What I do claim as new, and desire to secure by Letters Patent, is—

Paper, embossed and enamelled upon either one or both sides, whether before or after its conversion into articles of wearing-apparel, all substantially as herein described.

GEO. W. RAY.

Witnesses:

T. A. CURTIS,

F. E. RICE.